(12) United States Patent
Dai et al.

(10) Patent No.: US 12,341,929 B2
(45) Date of Patent: Jun. 24, 2025

(54) TRAINING AN INTENT MATCHING ENGINE OF A CONTACT CENTER

(71) Applicant: Zoom Communications, Inc., San Jose, CA (US)

(72) Inventors: Wei Dai, Hangzhou (CN); Maikl Adly Abdel-Malek Eskander, Seattle, WA (US)

(73) Assignee: Zoom Communications, Inc., San Jose, CA (US)

( * ) Notice: Subject to any disclaimer, the term of this patent is extended or adjusted under 35 U.S.C. 154(b) by 233 days.

(21) Appl. No.: 18/191,271

(22) Filed: Mar. 28, 2023

(65) Prior Publication Data

US 2024/0244136 A1 Jul. 18, 2024

Related U.S. Application Data

(63) Continuation of application No. PCT/CN2023/073011, filed on Jan. 18, 2023.

(51) Int. Cl.
*H04M 3/51* (2006.01)
*G06N 3/0464* (2023.01)
*G06N 3/09* (2023.01)

(52) U.S. Cl.
CPC ........ *H04M 3/5191* (2013.01); *G06N 3/0464* (2023.01); *G06N 3/09* (2023.01); *H04M 2201/40* (2013.01); *H04M 2201/42* (2013.01)

(58) Field of Classification Search
CPC ... H04M 3/5191; H04M 2201/42; G06N 3/09

USPC ............ 379/265.09, 265.02, 265.01, 265.11, 379/265.12, 265.13, 266.01, 266.02, 242

See application file for complete search history.

(56) References Cited

U.S. PATENT DOCUMENTS

| 2011/0314010 | A1* | 12/2011 | Ganti | G06F 16/2425 |
| | | | | 707/E17.014 |
| 2021/0117857 | A1 | 4/2021 | Sriharsha | |
| 2021/0303578 | A1* | 9/2021 | Dua | G06F 16/243 |

OTHER PUBLICATIONS

Intent Matching, Dialogflow ES, Google Cloud, https://cloud.google.com/dialogflow/es/docs/intents-matching, Jan. 11, 2023, 3 pages.

* cited by examiner

*Primary Examiner* — Thjuan K Addy
(74) *Attorney, Agent, or Firm* — Young Basile Hanlon & MacFarlane, P.C.

(57) ABSTRACT

A contact center server accesses queries provided by user devices. The contact center server determines a confidence score representing a likelihood that a query of the queries matches an intent using an intent matching engine. The contact center server matches, via the intent matching engine based on the confidence score exceeding a threshold, the query to the intent. The contact center server provides, to a client device, a subset of the queries that are not matched to any intent. The subset is identified based on confidence scores. The contact center server receives, from the client device, data representing an intent that matches at least one query in the subset. The contact center server trains the intent matching engine based on the received data.

20 Claims, 9 Drawing Sheets

TRAINING AN INTENT MATCHING ENGINE OF A CONTACT CENTER

CROSS-REFERENCE TO RELATED APPLICATION(S)

This application is a continuation of International Application Number PCT/CN2023/073011, filed Jan. 18, 2023, the entire disclosure of which is hereby incorporated by reference.

FIELD

This disclosure relates to training an intent matching engine of a contact center which may be implemented over a telephone or computer network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
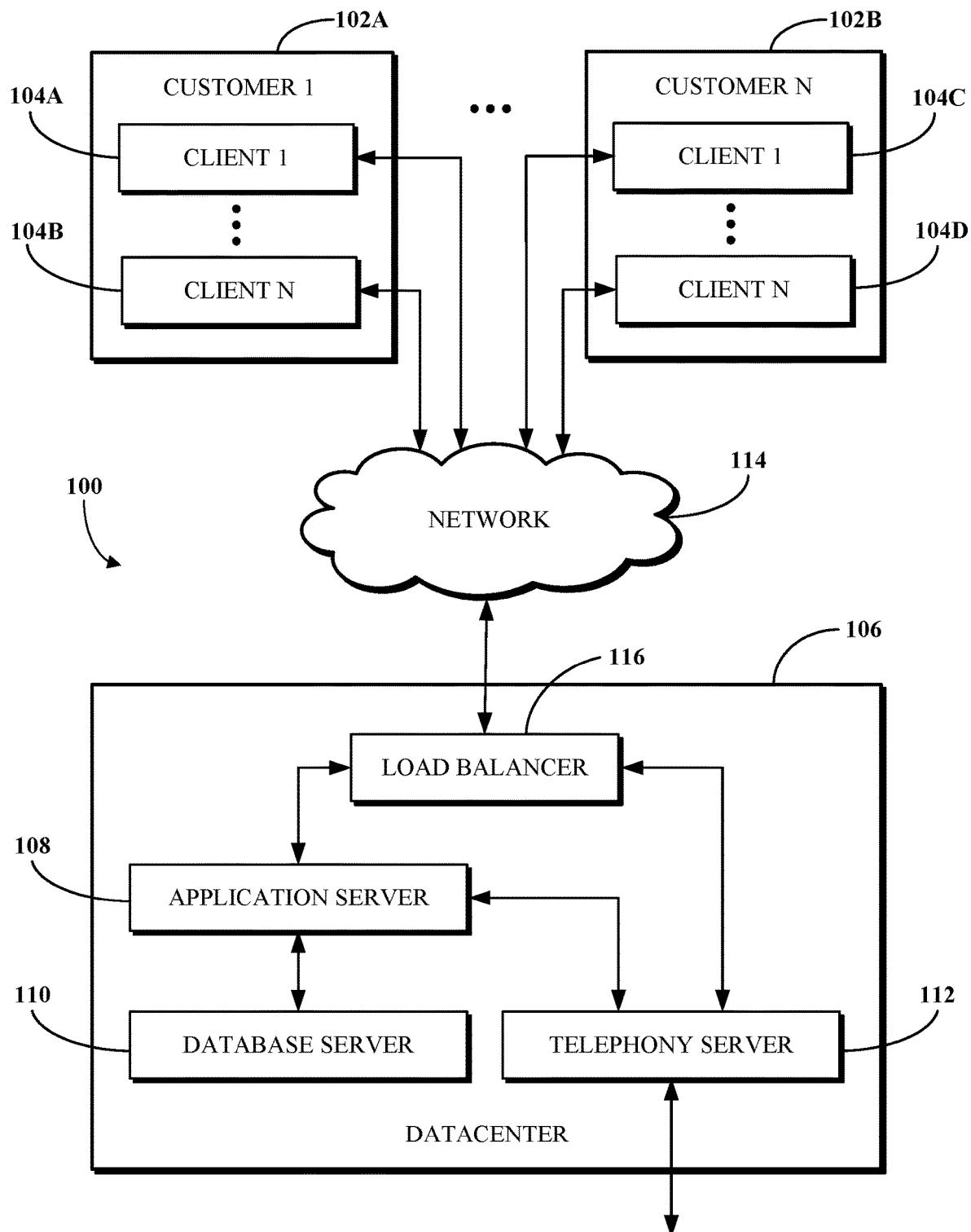
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A contact center may use a server to process a contact center engagement from a user device. In some implementations, upon a connection of the user device to the server, the server prompts a user of the user device to provide (e.g., by typing or speaking) a query indicating the reason for initiating the contact center engagement. The query is processed by an intent matching engine at the server, which leverages artificial intelligence techniques (e.g., a deep convolutional neural network) to match the query to an intent. The intent is a member of a predefined set of intents representing what the user wishes to accomplish. The intent may be associated with at least one of a workflow, a set of agents, or an automatic response. For example, a contact center of a bank may have an intent "close account," with all queries that lead to the request to close an account being associated with a common workflow (e.g., prompting the user to verify their identity and closing the account upon completing the verification), a set of agent responsible for closing accounts, or an automatic response (e.g., including a link to a webpage explaining how to close an account).

To train the intent matching engine, a supervised learning technique with training data including manually generated (e.g., by an administrator of a business using the contact center) queries and associated intents may be used. Training the intent matching engine with queries and intents similar to queries and intents that occur in the real world may be useful because this training data most resembles the real world inference data on which the intent matching engine is to be used, and reflects the latest changes in queries submitted by users (e.g., due to user circumstances or needs changing over time). However, it may be costly in person-hours to generate the training data, as it might take many person-hours to generate a large number of queries and to specify the intents that should be associated with the generated queries. More efficient approaches for training the intent matching engine may be desirable.

Implementations of this disclosure address problems such as these by generating a training data set for the intent matching engine based on a manual review of a subset of the queries processed by the intent matching engine, and automatically selecting the subset of the queries for the manual review. A contact center server accesses queries provided by user devices. The contact center server determines a confidence score for one or more of the accessed queries using an intent matching engine. The confidence score represents a likelihood that a query matches to a given intent. For example, the query, "I wish to close my credit card account," might match to the intent "close account" with a confidence score of 0.96, indicating that the server is highly confident that "close account" is the user's intent. If the confidence score for matching a given query to a given intent exceeds a threshold, the intent matching engine matches the given query to the given intent.

The contact center server generates a set of queries that are not matched to any intent using the above technique. From this set of queries, the contact center server selects a subset for use in further training (e.g., via online learning) the intent matching engine. The subset may be selected based on the confidence scores or the timestamps of the queries in the set. The confidence score may be useful to identify queries that are "almost" matched to intents (e.g., having a confidence score of 0.76, where the threshold for matching to the intent is 0.8). It may be beneficial to have the intent matching engine trained on these queries that were "almost" matched to the intent because, if the intent matching engine leverages an artificial neural network, only minor modifications of some of the weights applied in the neural network may be needed to increase the confidence score above the threshold. The timestamp may be useful because the structure of queries (and intents associated with the queries) may change over time in response to new product launches or changes in customer needs. For example, if a company that uses a contact center launches a new product line, customers of the company may access the contact center to purchase, ask questions about, or troubleshoot products associated with the new product line. The timestamp may be used to track queries and intents and changes therein over time. The contact center server transmits the subset of queries to one or more administrator devices. In response, users of the administrator devices manually match queries in the subset to intents to generate training data. The training data is received at the contact center server and used to further train the intent matching engine, for example, using online learning techniques.

As used herein, the term "engine" may include, among other things, a component of a physical computer or virtual machine that performs certain functions. The engine may be implemented using software that is stored in a memory and executed by processing circuitry. Alternatively, the engine may be hard-wired into the processing circuitry and implemented using hardware. In some cases, the engine may include both software and hardware components. An engine may include one or more sub-engines, each of which performs part of the functionality of the engine.

To describe some implementations in greater detail, reference is first made to examples of hardware and software structures used to implement training an intent matching engine of a contact center. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
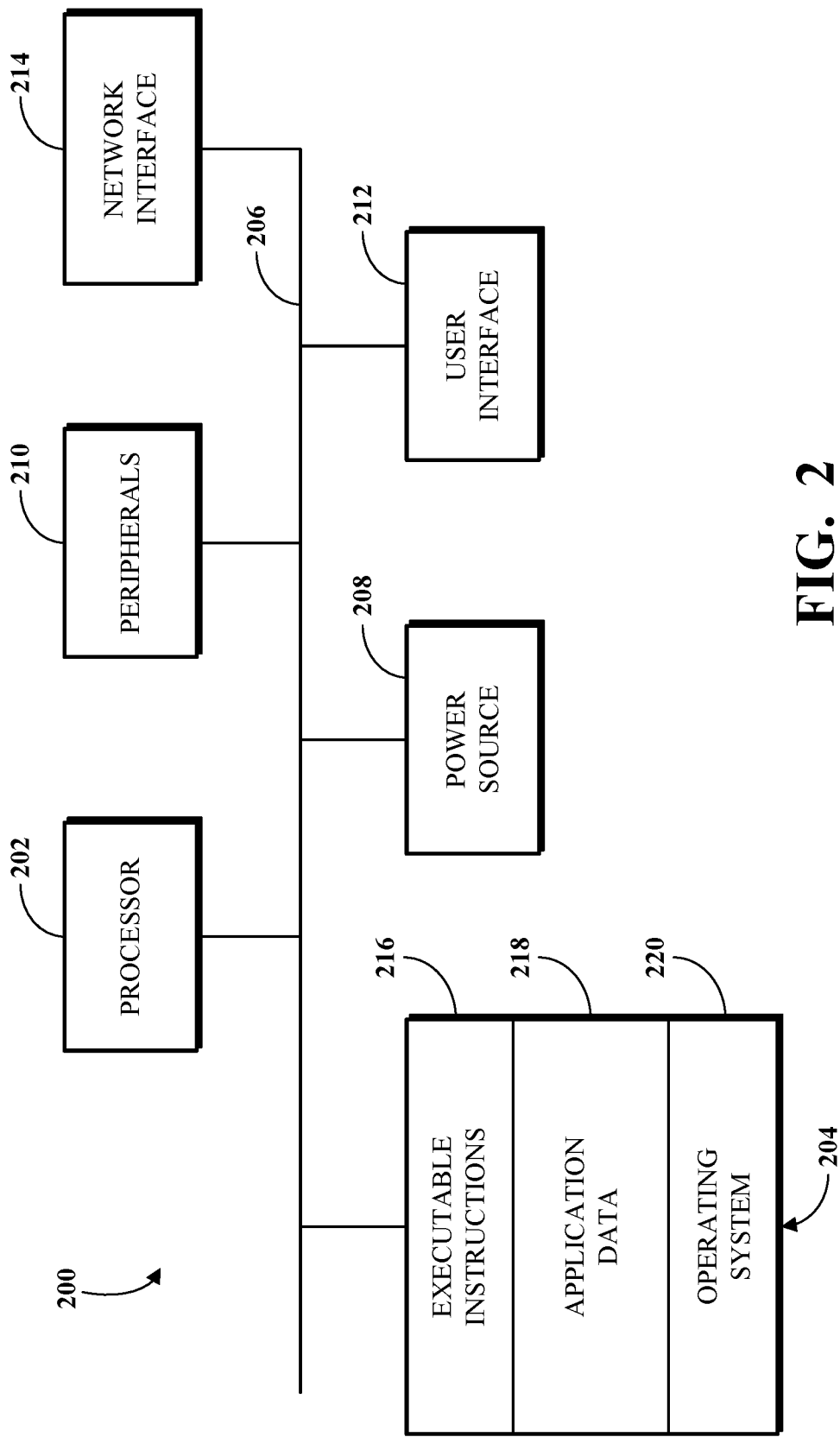
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
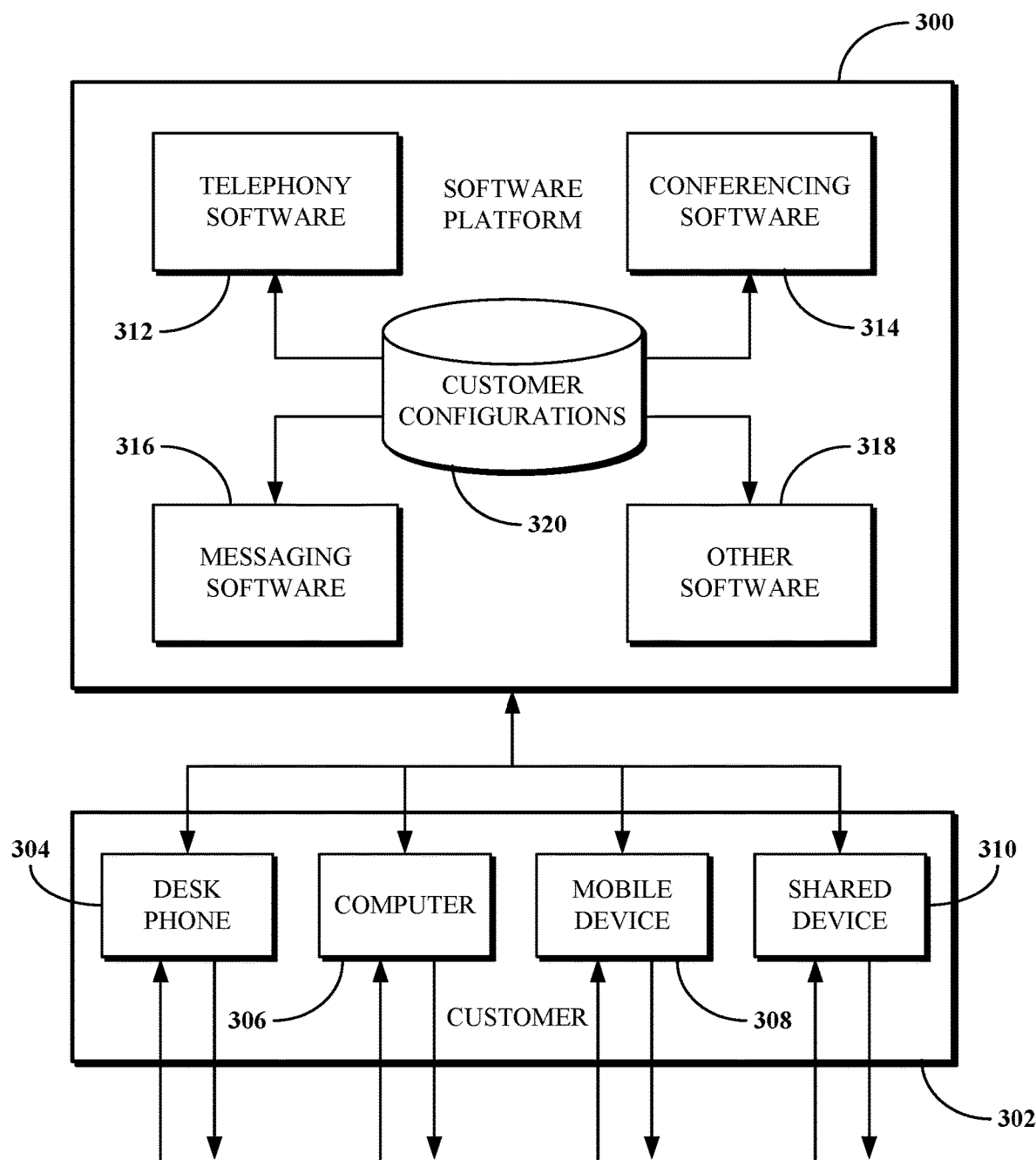
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for training an intent matching engine of a contact center.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
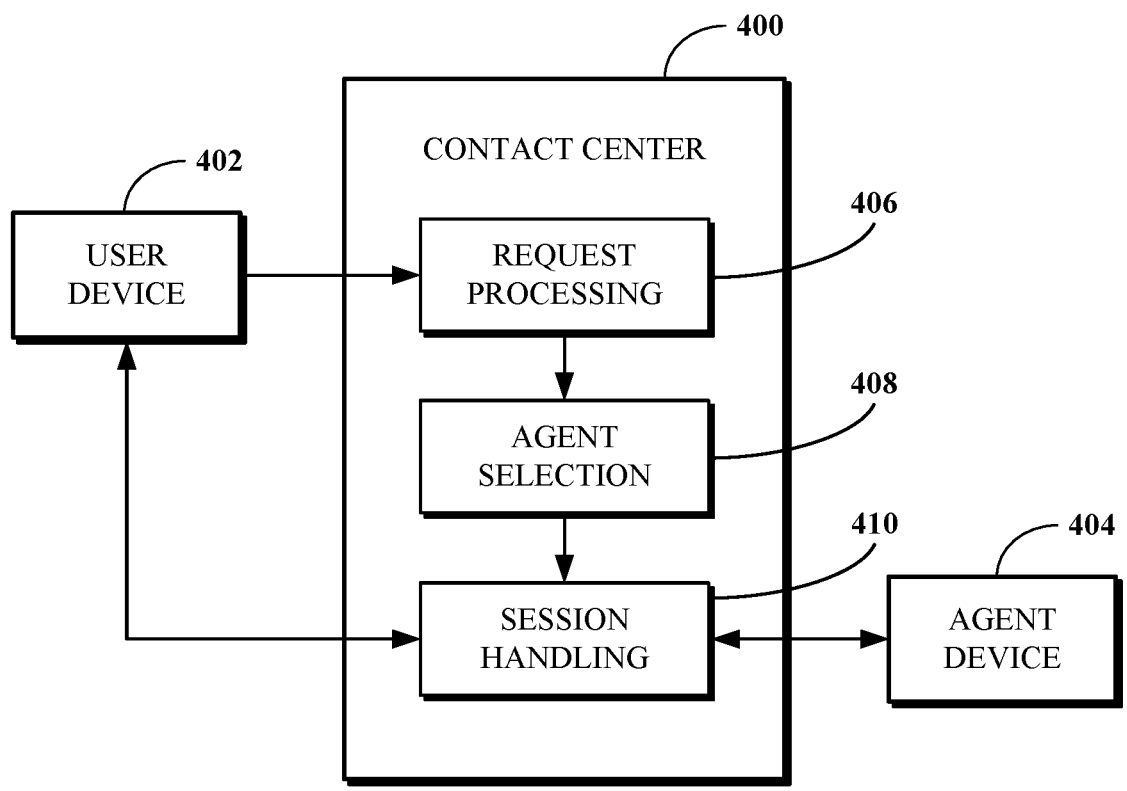
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a7 client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
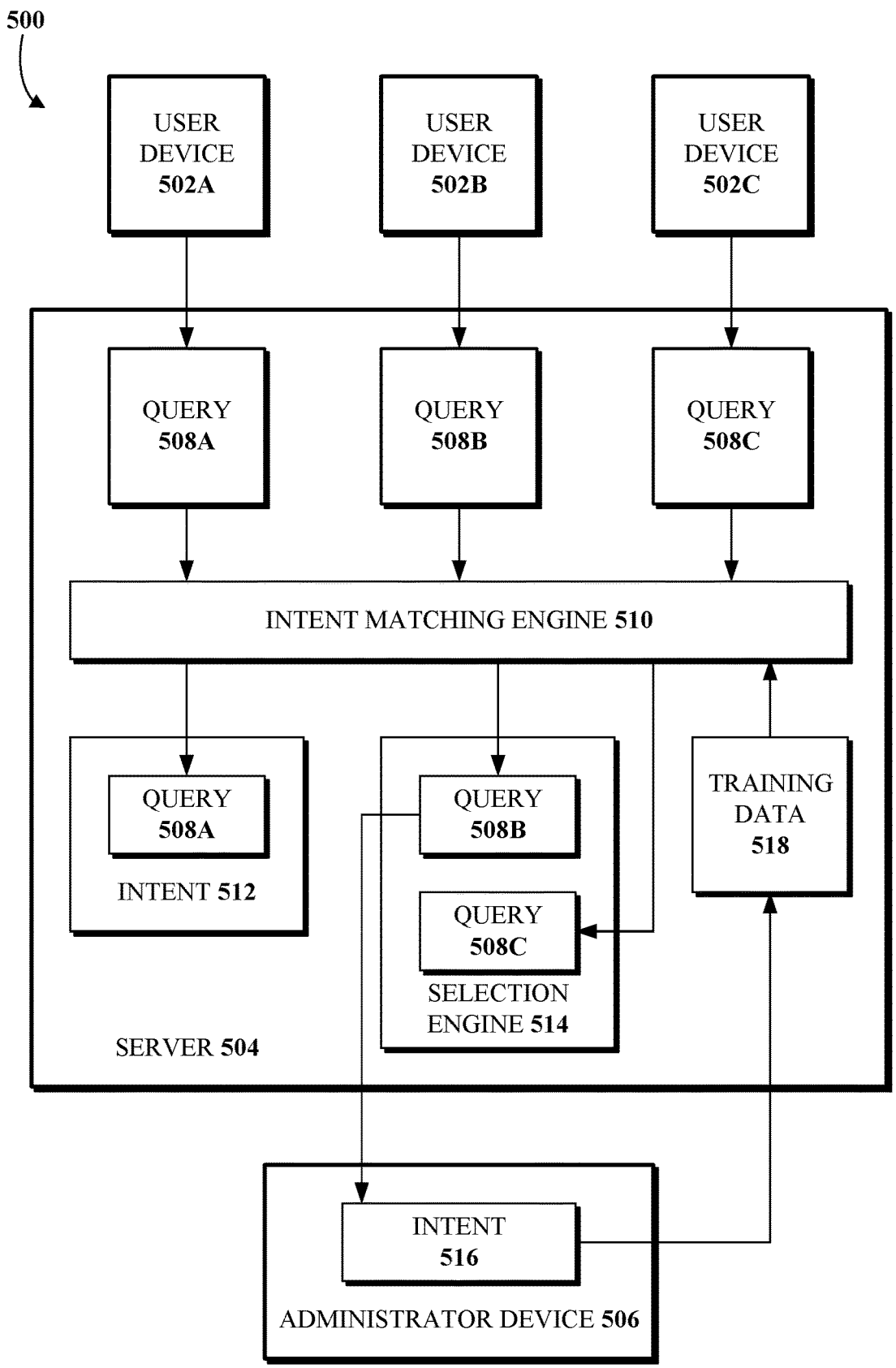
FIG. 5 is a block diagram of an example of a system for training an intent matching engine.

FIG. 5 is a block diagram of an example of a system 500 for training an intent matching engine. As shown, the system 500 includes user devices 502A-C, a server 504, and an administrator device 506. Each of the user devices 502A-C may correspond to the user device 402. The server 504 may be associated with the contact center 400 and may perform at least one of the request processing software 406, the agent selection software 408, or the session handling software 410 of the contact center 400. The administrator device 506 may correspond to the agent device 404 or may be distinct from the agent device 404. Thus, the administrator device 506 may be operated by an administrator, who may or may not be an agent.

As shown, the server stores queries 508A-C received from the user devices 502A-C, with the query 508A being received from the user device 502A, the query 508B being received from the user device 502B, and the query 508C being received from the user device 502C. More details of examples of data stored in conjunction with each query 502A-C are provided in conjunction with FIG. 6. The queries 508A-C are provided to the intent matching engine 510. The intent matching engine 510 may be implemented using one or more artificial intelligence techniques. For example, the intent matching engine 510 may include an artificial neural network (e.g., a convolutional neural network and/or a deep neural network). The intent matching engine 510 computes, for each of the queries 508A-C, a confidence score representing a probability that the query matches to an intent (or each of multiple intents from a set of intents). The confidence score may be computed using the artificial neural network based on a feature vector including text, audio, and/or video of the query.

As shown, based on the confidence score, the query 508A is matched, by the intent matching engine 510, to the intent 512. For example, the query 508A may be matched to the intent 512 due to the confidence score of the query 508A being matched to the intent 512 exceeding a matching threshold (e.g., as described in conjunction with FIG. 7). In one example, the query 508A may include the text "I would like to close my account," and the intent 512 may be "close account."

The query 508B and the query 508C are not matched to any intents, for example, due to their confidence scores not exceeding the matching threshold. As a result, the query 508B and the query 508C are provided, by the intent matching engine 510, to a selection engine 514 for processing.

The selection engine 514 identifies queries to be manually matched to an intent 516 by a user of the administrator device 506 in order to generate training data 518 for online training of the intent matching engine 510. In some cases, at most a predetermined number (e.g., three or five) of queries may be provided to the administrator device 506, so as not to overwhelm the user of the administrator device 506. In some cases, the queries provided to the administrator device 506 may have a timestamp at most a threshold time (e.g., one week) before a current time to ensure that the training data 518 includes recently generated queries, as queries from user devices 502A-C may change over time based on changes in the circumstances or the needs of the users of the user devices 502A-C. In some cases, the queries provided to the administrator device 506 may be queries having a confidence score within a range. The range may be between an uncertainty threshold and the matching threshold. In one example, confidence scores range between 0 and 1. The uncertainty threshold is 0.7 and the matching threshold is 0.8. As a result of these values, queries that are "almost" matched to the intent are used for training the intent matching engine 510 so as to increase the confidence scores of those queries if those queries are repeated or similar queries are presented.

As illustrated, the selection engine 514 selects the query 508B (but not the query 508C) for provision to the administrator device 506. At the administrator device 506, the user provides an input for matching the query 508B to the intent 516. The query 508B and intent 516 pair is transmitted to the server 504, where the pair is used as training data 518 for online learning-based training of the intent matching engine 510. As illustrated, a single query-intent match is made by the administrator device 506. However, in some implementations, multiple query-intent pairs may be provided, by the administrator device 506, to the training data 518. In some cases, multiple administrator devices (including the administrator device 506) may be used. The multiple administrator devices 506 may receive mutually exclusive queries to match to intents. Alternatively, a single query may be provided to multiple administrator devices for matching to an intent and may be stored in the training data 518 if at least a threshold number (e.g., at least two or at least 50% of the total number of administrator devices to which the query was provided) match the query to the same intent.

Online-learning based training of the intent matching engine 510 may include training the intent matching engine 510 after it has been used for inference in the real world. For example, the intent matching engine 510 may be used to match queries to intents and, after such use, be provided with additional training data to refine the query-intent matching.

After the additional training data is used to train the intent matching engine 510, the intent matching engine is once again used for inference. This may be similar to how a human initially learns a skill (e.g., how to bake a cake) and then refines their skill based on feedback they receive in the real world. For example, a person might learn that their cake is not sufficiently sweet and may add more sugar in the next iteration.

Figure 6:
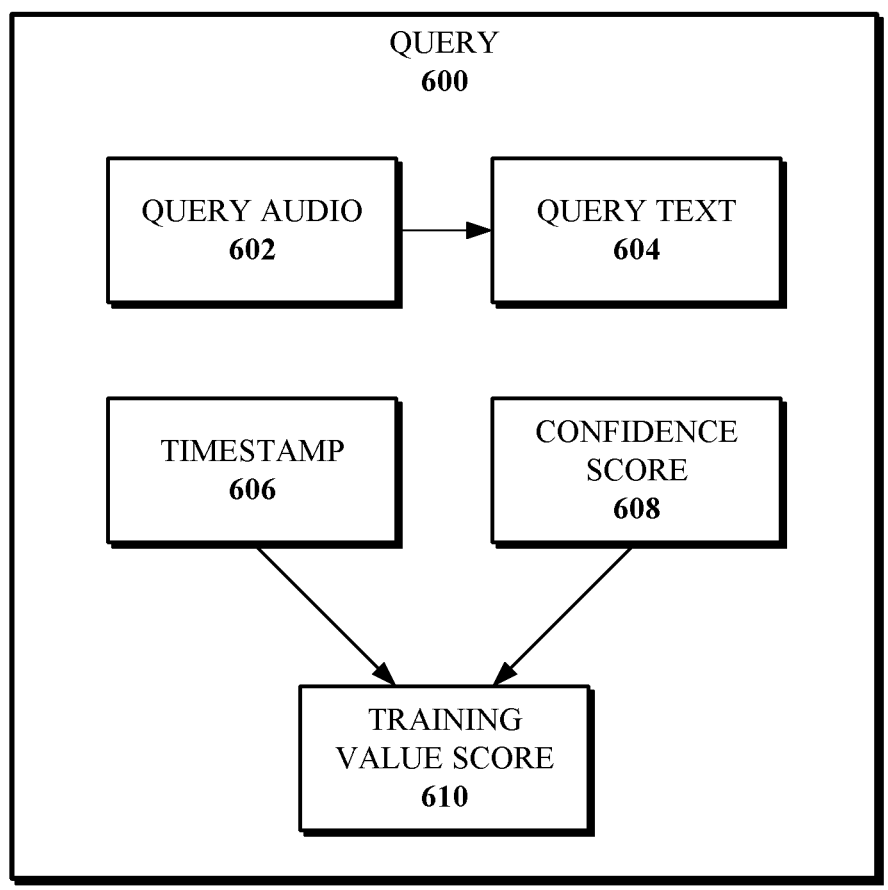
FIG. 6 is a block diagram of an example of stored data associated with a query.

FIG. 6 is a block diagram of an example of stored data associated with a query 600. The query 600 may correspond to one of the queries 508A-C. As shown, the query 600 stores a query audio 602. The query audio 602 may be an audio or video recording of speech by a user at the user device 502A-C in response to being asked to state a reason for accessing the contact center 400. For example, the query audio 602 may include an audio or video of a user saying, "I would like to return the product." The query audio 602 may be converted to query text 604 using a speech-to-text engine (e.g., an artificial neural network trained to convert speech to text in a natural language) residing at the server 504 or another machine. The query text may store the text generated by the speech-to-text engine, for example, the text, "I would like to return the product." In some cases, the user may type the query 600 (e.g., if the user is using or has access to a chat interface) instead of speaking the query to an audio or video recorder. In these cases, there would be no query audio 602 and the typed text would be stored as the query text 604. It should be noted that the user is notified that they are being recorded and persistent notifications (e.g., a visual icon) may be presented at the user device 502A-C to inform the user that the recording is ongoing. The user may opt out of being recorded or of having their recording stored after the contact center engagement is completed. In some cases, if the user is using video calling technology to access the contact center, the user may agree to have their audio recorded while disagreeing to have visual data from the user device 502A-C recorded, as the query text 604 may be generated without using visual data.

As shown, the query 600 has a timestamp 606. The timestamp 606 represents a time when the user spoke the query audio 602 or typed the query text 604. The query 600 has a confidence score 608. The confidence score 608 represents a likelihood that the query 600 matches to an intent, as calculated by the intent matching engine 510. In some cases, multiple confidence scores 608 may be calculated for matching the query 600 to multiple different intents. For example, the query "I would like a replacement for the new version of the product," may have a confidence score of 0.75 for the intent "exchange product," a confidence score of 0.63 the intent "return product," and a confidence score of 0.09 for the intent "close account." In these cases, the highest confidence score (e.g., the confidence score of 0.75 for the intent "replace product") may be used as the confidence score 608, as the query is most likely to match to the intent associated with the highest confidence score.

As illustrated, a training value score 610 is computed based on the timestamp 606 and the confidence score 608. The training value score 610 may be used, by the selection engine 514, to determine whether to transmit the query 600 to the administrator device 506 for manual intent matching to generate the training data 518. The training value score 610 may be computed to favor more recent timestamps and confidence scores that represent "almost" being matched to an intent. In one example, the training value score 610 is a Boolean value that is set to true if the confidence score is greater than 80% of the matching threshold and less than the matching threshold and if the timestamp is within one month of the current time, and is set to false otherwise. The selection engine 514 may select, for provision to the administrator device 506, queries having a training value score of true.

Figure 7:
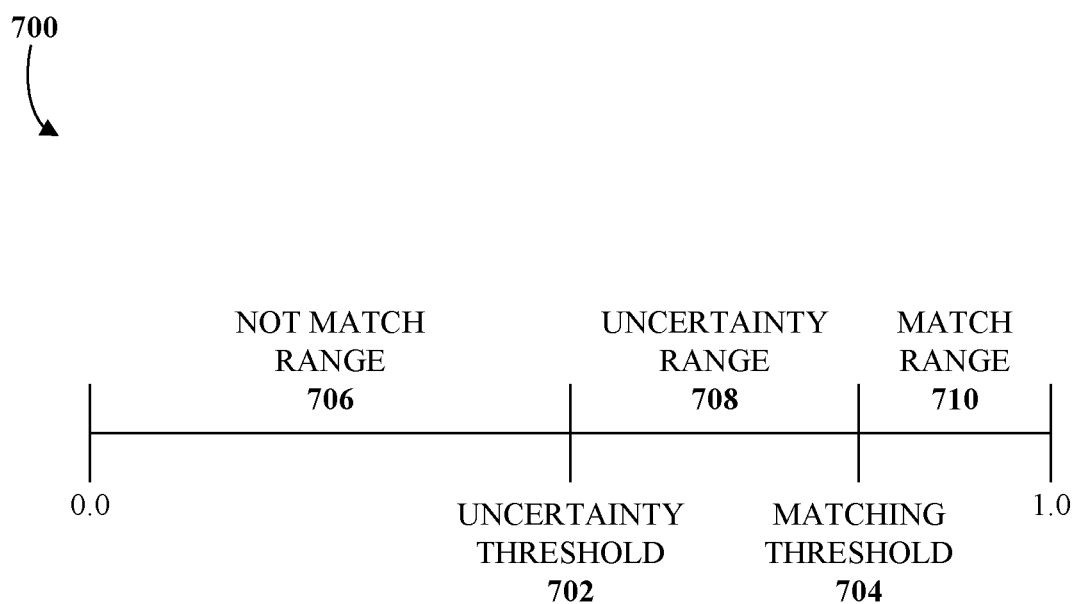
FIG. 7 is a number line of values of confidence scores.

FIG. 7 is a number line 700 of values of confidence scores (e.g., the confidence score 608) associated with a query matching to an intent. As shown, the confidence score values range from 0.0 to 1.0, and include an uncertainty threshold 702 and a matching threshold 704. Confidence scores below the uncertainty threshold 702 correspond to a not match range 706. The not match range 706 indicates that the query is very unlikely to match to the intent. Thus, adding queries associated with the not match range 706 to the training data 518 might not be very valuable.

Confidence scores between the uncertainty threshold 702 and the matching threshold 704 correspond to an uncertainty range 708. A query falling in the uncertainty range 708 is not sufficiently likely to match to the intent for the intent matching engine 510 to assign the query to the intent but is "close enough" to the matching threshold 704 that receiving confirmation (e.g., via the administrator device 506) of whether the query matches to the intent and training the intent matching engine 510 based on the confirmation may be useful.

Confidence scores exceeding the matching threshold 704 correspond to a match range 710. A query falling in the match range 710 is matched to the associated intent by the intent matching engine 510, and the associated user device is then processed according to a workflow for the intent and/or assigned to an agent who is capable of handling the intent. The workflow may include a series of manual or automated steps to perform to handle the intent. For example, for the intent "return product," the workflow may include (1) identifying the product and the order, (2) verifying that the product is eligible for returning, and (3) generating a shipping label to return the product.

The uncertainty threshold 702 and/or the matching threshold 704 may correspond to different numeric values. In one example, the uncertainty threshold 702 is equal to 0.5, and the matching threshold 704 is equal to 0.8. The not match range 706 corresponds to 0.0 through 0.5. the uncertainty range 708 correspond to 0.5 through 0.8. The match range 710 corresponds to 0.8 through 1.0. In other examples, different values of the uncertainty threshold 702 and/or the matching threshold 704 may be used. Furthermore, the bounds of the number line 700 are shown as 0.0 and 1.0; however, in alternative implementations, confidence scores may be bounded by values different from 0.0 and 1.0, for example, confidence scores may be expressed in the interval of −100 through 100.

Figure 8:
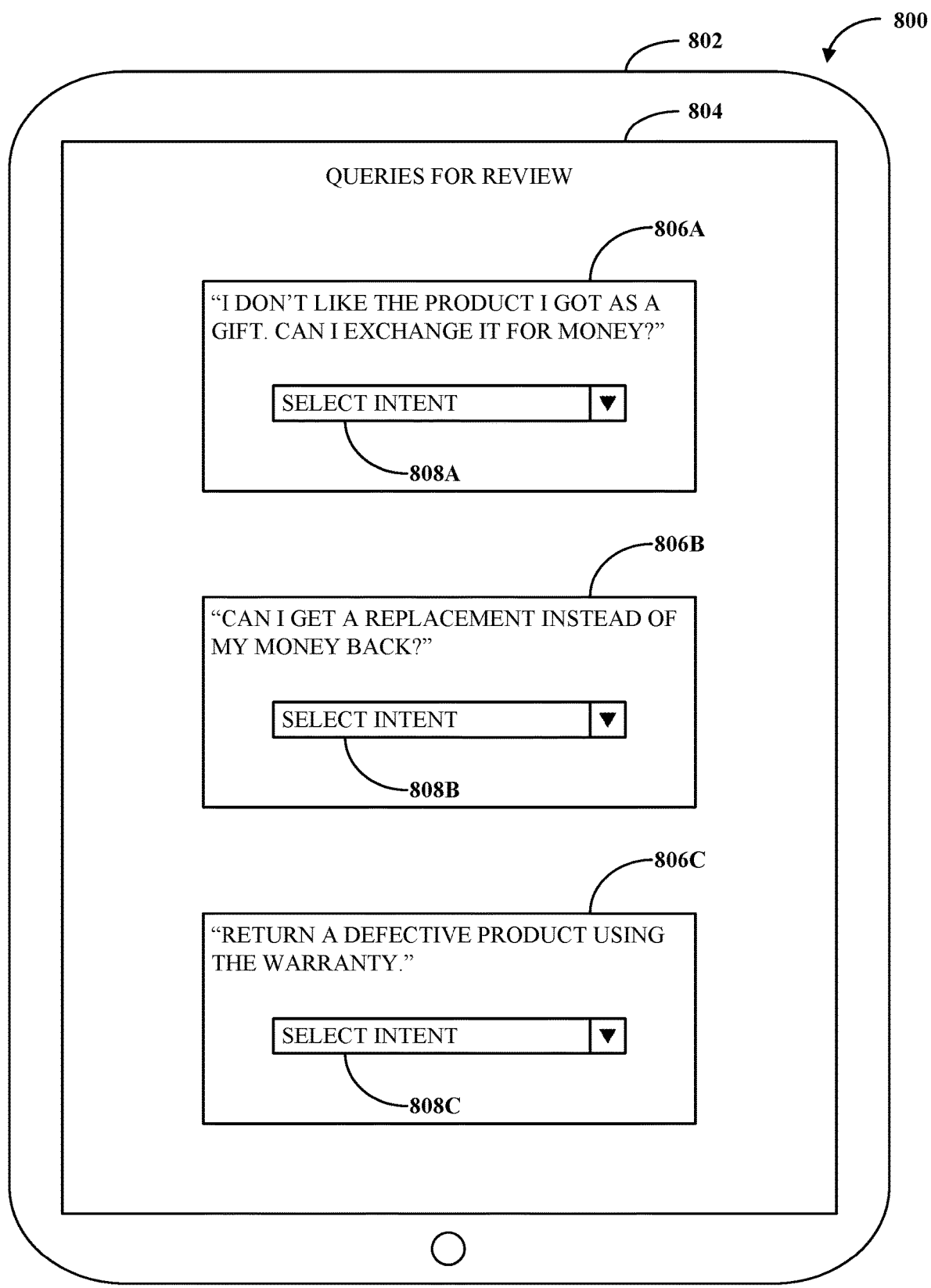
FIG. 8 is an example graphical user interface (GUI) for matching intents to queries at a client device.

FIG. 8 is an example GUI 800 for matching intents to queries at a client device. As shown, the GUI 800 is presented at a mobile device 802 (e.g., a mobile phone or a tablet computer). However, the GUI 800 may be presented at another computing device, such as a laptop computer or a desktop computer. The GUI 800 may be presented at a client device capable of communicating (e.g., via a network) with the server 504, such as the administrator device 506.

As illustrated, the mobile device 802 includes a screen 804 that presents queries for review. The screen 804 includes query representations 806A-C. As shown, the query representation 806A includes a query text (e.g., the query text 604)—"I don't like the product I got as a gift. Can I exchange it for money?"—and a menu 808A for selecting an intent matching to the query. The menu 808A, when selected (e.g., by touching the menu 808A with a finger or a stylus), may include menu items for different intents to which the query may be matched (e.g., all available intents or intents for which the confidence score 608 exceeds the uncertainty threshold 702). Using the menu 808A, the user of the mobile device 802 may select a correct intent to which the query represented by the query representation 806A is to be matched, generating a query-intent pair that is added to the training data 518 of the intent matching engine 510. Similarly, the query representation 806B includes a query text—"Can I get a replacement instead of my money back?"—and a menu 808B. The query representation 806C includes a query text—"Return a defective product using the warranty."—and the menu 808C.

Figure 9:
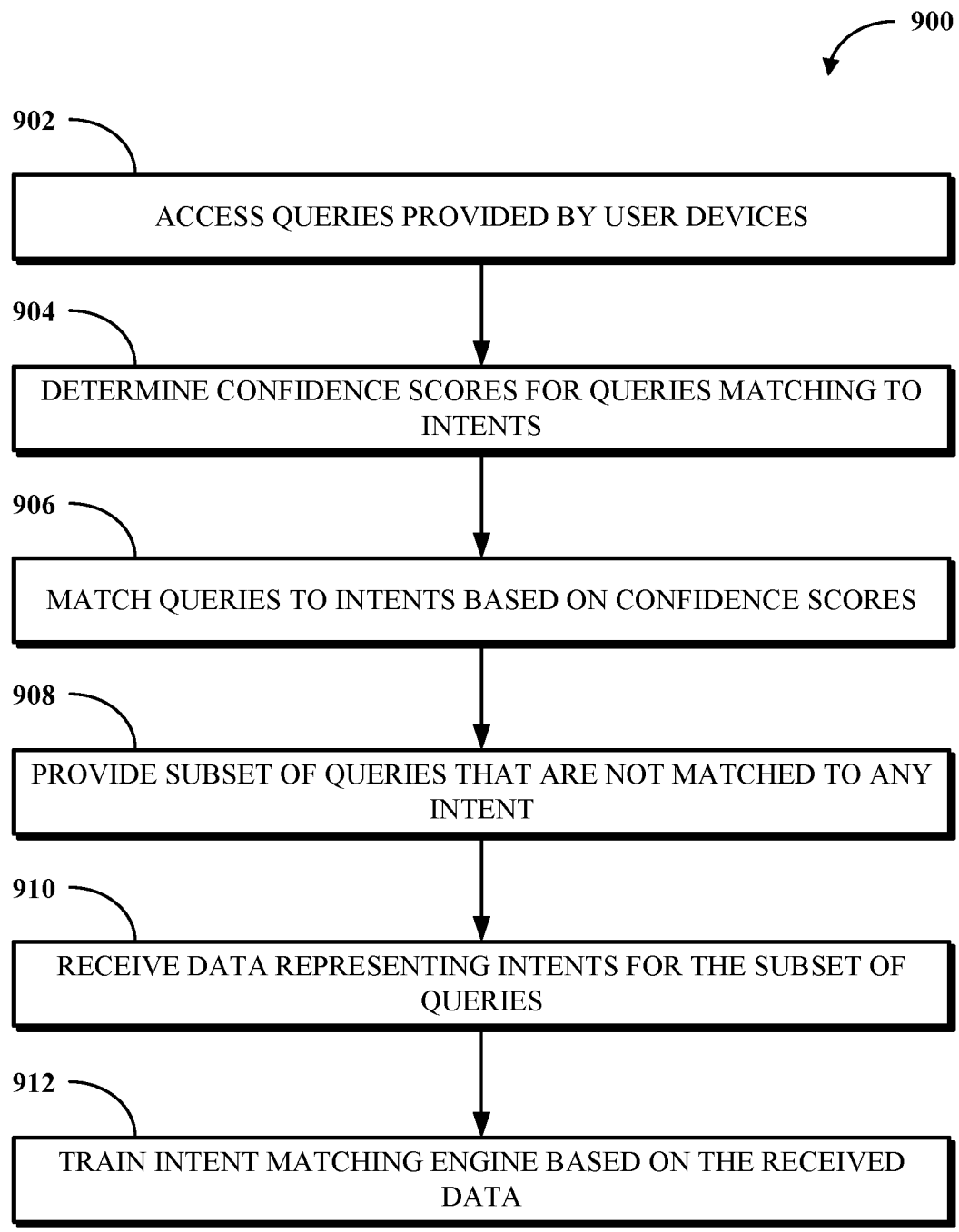
FIG. 9 is a flowchart of an example of a technique for training an intent matching engine of a contact center.

To further describe some implementations in greater detail, reference is next made to examples of techniques which may be performed by a contact center server in online learning-based training an intent matching engine and inference using the intent matching engine. FIG. 9 is a flowchart of an example of a technique 900 for training an intent matching engine of a contact center. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 900 may be implemented at a server of a contact center, for example, the server 504 or a server of the contact center 400. The technique 900 may be implemented in parallel with at least one of the request processing software 406, the agent selection software 408, or the session handling software 410.

At 902, the server of the contact center accesses queries (e.g., the queries 508A-C) provided by user devices (e.g., the user devices 502A-C). The server may convert the received queries into a standardized format. For example, the queries may be converted to text and foreign language queries may be translated into a default natural language (e.g., English).

At 904, the server determines a confidence scores (e.g., the confidence score 608) for queries matching to intents. Each confidence score represents a likelihood that a query of the queries matches an intent. The confidence scores are determined using an intent matching engine (e.g., the intent matching engine 510). The confidence score may be determined using statistical or machine learning techniques. The likelihood may be a probability or another representation of likelihood (e.g., an odds ratio).

At 906, the server matches the queries to the intents based on the confidence scores exceeding a threshold (e.g., the matching threshold 704) and using the intent matching engine. Using the confidence scores, some queries are successfully matched to an intent, while other queries are not matched to any intent (e.g., due to the confidence score being below the threshold). If the intent is matched to the query, the user device that submitted the query may be processed based on the intent. For example, the user device may be connected to an agent device with an agent that is capable of handling the intent. Alternatively, an automated workflow may be used to handle the intent. For example, if user wishes to purchase a product, the user may be provided with a web address where they can make the purchase or the user may be prompted, by an automated engine at the server, to provide their payment information and shipping information.

At 908, the server provides, to a client device (e.g., the administrator device 506), a subset of the queries that are not matched to any intent. The server identifies the subset based on timestamps or confidence scores. In some cases, the subset includes queries having timestamps during a threshold time period (e.g., within one week of a current time) and confidence scores within a range (e.g., between the uncertainty threshold 702 and the matching threshold 704). In some cases, the subset is identified based on a training utility score (e.g., the training value score 610) of each query. The training utility score may be computed based on a combination (e.g., a mathematical or logical combination) of the timestamp and the confidence score.

In some cases, all of the queries in the subset are provided to a single client device for the user of the single client device to match the queries to intents. Alternatively, if multiple client devices are available, the queries in the subset may be divided among the multiple client devices to reduce the workload provided to each client device user. For example, if there are ten client devices available and fifty queries in the subset, five queries may be provided to each client device to avoid overwhelming the users of the client devices.

At 910, the server receives, from the client device (or from one or more of the multiple client devices), data representing intents for the subset of queries. In some cases, the user of the client device may fail to match at least one query to an intent, and the server may receive data representing an intent that matches at least one query in the subset. The server may cause the client device to display a GUI (e.g., as shown in FIG. 8) indicating the subset of queries and a prompt, to the user of the client device, to match the queries to intents. When the user matches the queries to the intents, the server may receive, from the client device, a notification of the query-intent matches or a notification that a given query does not match to any intent.

At 912, the server trains the intent matching engine based on the received data. A supervised learning technique may be used, as the received data includes queries labeled with intents. Alternatively, another machine learning technique, for example semi-supervised learning or reinforcement learning may be used. The intent matching engine may be trained using online learning, as the training may take place after the intent matching engine is already being used for inference in the real world.

The training of the intent matching engine may occur in real-time when the data is received. Alternatively, the training may be scheduled to occur during off peak hours when the contact center is predicted to be accessed by fewer than a predefined number of user devices or when the load on the contact center server is predicted to be (or is actually) below a threshold. For example, the training may be scheduled to occur between the hours 2:00 AM and 4:00 AM, when few users are expected to access the contact center. If there are unusual circumstances and multiple users actually access the contact center during those hours, the training may be rescheduled until the volume of users accessing the contact center decreases.

Some implementations are described below as numbered examples (Example 1, 2, 3, etc.). These examples are provided as examples only and do not limit the other implementations disclosed herein.

Example 1 is a method comprising: accessing queries provided by user devices to a contact center server; determining a confidence score representing a likelihood that a query of the queries matches an intent using an intent matching engine; matching, via the intent matching engine, the query to the intent when the confidence score exceeds a threshold; providing, to a client device, a subset of the queries that are not matched to any intent, the subset being identified based on confidence scores; receiving, from the client device, data representing an intent that matches at least one query in the subset; and training the intent matching engine based on the received data from the client device.

In Example 2, the subject matter of Example 1 includes, the subset comprising a predefined number of queries and the subset comprising queries having the confidence score within a range.

In Example 3, the subject matter of Examples 1-2 includes, the intent matching engine comprising a deep convolutional neural network trained via online learning.

In Example 4, the subject matter of Examples 1-3 includes, providing different subsets of queries to each of multiple different client devices, the client device being one of the multiple different client devices; receiving the data from the multiple client devices; and training the intent matching engine based on the received data from the multiple client devices.

In Example 5, the subject matter of Examples 1-4 includes, wherein the training of the intent matching engine occurs during off peak hours when the contact center server is accessed by fewer than a predefined number of user devices.

In Example 6, the subject matter of Examples 1-5 includes, wherein providing, to the client device, the subset of queries comprises: causing display, at the client device, of a graphical user interface indicating at least one of the subset of queries, a collection of intents, or a prompt to match the queries to the intents.

In Example 7, the subject matter of Examples 1-6 includes, wherein accessing the queries comprises: accessing at least one of an audio query or a video query; and converting the at least one of the audio query or the video query to a text query using a speech-to-text engine.

In Example 8, the subject matter of Examples 1-7 includes, identifying, using a selection engine, the subset of queries for provision to the client device, the selection engine calculating a training value score for a query from the subset of queries based on the confidence score and determining, based on the training value score, whether to place the query into the subset of queries.

Example 9 is a non-transitory computer readable medium storing instructions operable to cause one or more processors to perform operations comprising: accessing queries provided by user devices to a contact center server; determining a confidence score representing a likelihood that a query of the queries matches an intent using an intent matching engine; matching, via the intent matching engine, the query to the intent when the confidence score exceeds a threshold; providing, to a client device, a subset of the queries that are not matched to any intent, the subset being identified based on confidence scores; receiving, from the client device, data representing an intent that matches at least one query in the subset; and training the intent matching engine based on the received data from the client device.

In Example 10, the subject matter of Example 9 includes, the subset comprising queries having the confidence score within a range.

In Example 11, the subject matter of Examples 9-10 includes, the intent matching engine comprising a deep neural network trained via online supervised learning.

In Example 12, the subject matter of Examples 9-11 includes, the operations comprising: providing subsets of queries to each of multiple client devices, the client device being one of the multiple client devices; and receiving the data from the multiple client devices; and training the intent matching engine based on the received data from the multiple client devices.

In Example 13, the subject matter of Examples 9-12 includes, wherein the training of the intent matching engine occurs during a time when the contact center server is accessed by fewer than a predefined number of user devices.

In Example 14, the subject matter of Examples 9-13 includes, wherein providing, to the client device, the subset of queries comprises: causing presentation, at the client device, of a user interface indicating the subset of queries or a collection of intents.

In Example 15, the subject matter of Examples 9-14 includes, wherein accessing the queries comprises: accessing at least one query comprising audio; and converting the at least one query comprising audio to a text query using a speech-to-text engine.

In Example 16, the subject matter of Examples 9-15 includes, the operations comprising: identifying the subset of queries for provision to the client device by calculating a training value score for a query from the subset of queries based on the confidence score and determining, based on the training value score, whether to place the query into the subset of queries.

Example 17 is an apparatus comprising: a memory; and a processor configured to execute instructions stored in the memory to: access queries provided by user devices to a contact center server; determine a confidence score representing a likelihood that a query of the queries matches an intent using an intent matching engine; match, via the intent matching engine, the query to the intent when the confidence score exceeds a threshold; provide, to a client device, a subset of the queries that are not matched to any intent, the subset being identified based on confidence scores; receive, from the client device, data representing an intent that matches at least one query in the subset; and train the intent matching engine based on the received data from the client device.

In Example 18, the subject matter of Example 17 includes, the subset comprising queries having the confidence score within a range.

In Example 19, the subject matter of Examples 17-18 includes, the intent matching engine comprising a convolutional neural network trained via online learning.

In Example 20, the subject matter of Examples 17-19 includes, wherein the training of the intent matching engine is scheduled to occur when the contact center server is accessed by fewer than a predefined number of user devices.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   accessing queries provided by user devices to a contact center server;
   determining a confidence score representing a likelihood that a query of the queries matches an intent using an intent matching engine;
   matching, via the intent matching engine, the query to the intent when the confidence score exceeds a threshold;
   providing, to a client device, a subset of the queries that are not matched to any intent, the subset being identified based on confidence scores;
   receiving, from the client device, data representing an intent that matches at least one query in the subset; and
   training the intent matching engine based on the received data from the client device.

2. The method of claim 1, the subset comprising a predefined number of queries and the subset comprising queries having the confidence score within a range.

3. The method of claim 1, the intent matching engine comprising a deep convolutional neural network trained via online learning.

4. The method of claim 1, comprising:
   providing different subsets of queries to each of multiple different client devices, the client device being one of the multiple different client devices;
   receiving the data from the multiple client devices; and
   training the intent matching engine based on the received data from the multiple client devices.

5. The method of claim 1, wherein the training of the intent matching engine occurs during off peak hours when the contact center server is accessed by fewer than a predefined number of user devices.

6. The method of claim 1, wherein providing, to the client device, the subset of queries comprises:
   causing display, at the client device, of a graphical user interface indicating at least one of the subset of queries, a collection of intents, or a prompt to match the queries to the intents.

7. The method of claim 1, wherein accessing the queries comprises:
   accessing at least one of an audio query or a video query; and
   converting the at least one of the audio query or the video query to a text query using a speech-to-text engine.

8. The method of claim 1, comprising:
   identifying, using a selection engine, the subset of queries for provision to the client device, the selection engine calculating a training value score for a query from the subset of queries based on the confidence score and determining, based on the training value score, whether to place the query into the subset of queries.

9. A non-transitory computer readable medium storing instructions operable to cause one or more processors to perform operations comprising:
   accessing queries provided by user devices to a contact center server;
   determining a confidence score representing a likelihood that a query of the queries matches an intent using an intent matching engine;
   matching, via the intent matching engine, the query to the intent when the confidence score exceeds a threshold;
   providing, to a client device, a subset of the queries that are not matched to any intent, the subset being identified based on confidence scores;
   receiving, from the client device, data representing an intent that matches at least one query in the subset; and
   training the intent matching engine based on the received data from the client device.

10. The computer readable medium of claim 9, the subset comprising queries having the confidence score within a range.

11. The computer readable medium of claim 9, the intent matching engine comprising a deep neural network trained via online supervised learning.

12. The computer readable medium of claim 9, the operations comprising:
    providing subsets of queries to each of multiple client devices, the client device being one of the multiple client devices; and
    receiving the data from the multiple client devices; and
    training the intent matching engine based on the received data from the multiple client devices.

13. The computer readable medium of claim 9, wherein the training of the intent matching engine occurs during a time when the contact center server is accessed by fewer than a predefined number of user devices.

14. The computer readable medium of claim 9, wherein providing, to the client device, the subset of queries comprises:
    causing presentation, at the client device, of a user interface indicating the subset of queries or a collection of intents.

15. The computer readable medium of claim 9, wherein accessing the queries comprises:
    accessing at least one query comprising audio; and
    converting the at least one query comprising audio to a text query using a speech-to-text engine.

16. The computer readable medium of claim 9, the operations comprising:
    identifying the subset of queries for provision to the client device by calculating a training value score for a query from the subset of queries based on the confidence score and determining, based on the training value score, whether to place the query into the subset of queries.

17. An apparatus comprising:
    a memory; and
    a processor configured to execute instructions stored in the memory to:
    access queries provided by user devices to a contact center server;
    determine a confidence score representing a likelihood that a query of the queries matches an intent using an intent matching engine;
    match, via the intent matching engine, the query to the intent when the confidence score exceeds a threshold;
    provide, to a client device, a subset of the queries that are not matched to any intent, the subset being identified based on confidence scores;
    receive, from the client device, data representing an intent that matches at least one query in the subset; and
    train the intent matching engine based on the received data from the client device.

18. The apparatus of claim 17, the subset comprising queries having the confidence score within a range.

19. The apparatus of claim 17, the intent matching engine comprising a convolutional neural network trained via online learning.

20. The apparatus of claim 17, wherein the training of the intent matching engine is scheduled to occur when the contact center server is accessed by fewer than a predefined number of user devices.

* * * * *